United States Patent [19]
Bush

[11] 3,885,989
[45] May 27, 1975

[54] THERMAL BATTERY

[75] Inventor: Donald M. Bush, Tijeras, N. Mex.

[73] Assignee: The United States Energy Research and Development Administration, Washington, D.C.

[22] Filed: May 30, 1974

[21] Appl. No.: 474,549

[52] U.S. Cl. ............................ 136/83 T; 136/100 R
[51] Int. Cl. .......................................... H01m 21/14
[58] Field of Search ............ 136/83 T, 83 R, 100 R, 136/20, 6 LF, 6 R, 137, 153, 112, 90

[56] References Cited
UNITED STATES PATENTS

| | | | |
|---|---|---|---|
| 3,527,615 | 9/1970 | Clark et al. | 136/83 T |
| 3,669,748 | 6/1972 | McCullough et al. | 136/83 T |
| 3,677,822 | 7/1972 | Bush | 136/83 T |

Primary Examiner—Anthony Skapars
Attorney, Agent, or Firm—Dean E. Carlson; Dudley W. King; Richard E. Constant

[57] ABSTRACT

An improved thermal battery of the type which includes an electrically conductive heat generating disc, a calcium anode, a depolarizer-binder-electrolyte (DEB) mixture pellet positioned within each electrochemical cell and each cell includes calcium hydroxide mixed in the DEB pellet.

2 Claims, 4 Drawing Figures

PATENTED MAY 27 1975    3,885,989

THERMAL BATTERY

BACKGROUND OF INVENTION

A thermal battery includes a normally solid fusible electrolyte in each of its electrochemical cells which is heated by some appropriate means to fuse the electrolyte and thus activate the cells and battery. The battery will continue to operate so long as its temperature is maintained above the melting point of the electrolyte, until chemicals are used up in the electrochemical process which produces the electricity, or until some failure mechanism occurs which prevents or degrades further battery operation. Most generally, the uncontrollable limiting factor in thermal battery life is in the latter mechanism.

A typical thermal battery may be such as is described in U.S. Pat. No. 3,677,822 to Donald M. Bush and dated July 18, 1972. This battery will generally operate for some desired time period before the battery output decreases or terminates. It has been found that these batteries may fail due to small quantities or drops of molten conductive material forming about the outer edges of the cell which may accumulate sufficiently to cause a bridging or shorting of cell electrodes. These drops are often calcium-lithium compound or alloy which is formed at the interface between the anode and the electrolyte pellet of each battery cell. The anode in these batteries is generally formed from calcium while the electrolyte pellet is formed from a three-component mixture of a depolarizer (for example calcium chromate), and electrolyte (for example a fused mixture of potassium chloride and lithium chloride in a eutectic composition) and a binder (for example silicon dioxide). The molten calcium-lithium alloy is believed to be the actual active anode of the electrochemical cell system. Since the cells and the cell parts are pressed together and generally maintained under pressure so as to insure good electrical contact between the cell elements during operation, the molten alloy when formed and molten electrolyte may tend to move due to inherent variations in internal cell stack forces or to shock and vibration forces and may eventually reach the edges or periphery of the cells where the alloy may form or accumulate. When sufficient alloy accumulates at the edge of a cell, the cell may be shorted and cause battery failure, noise or other degradation of battery operation. This shorting or noise generation may often occur within the first few minutes after activation of the thermal battery begins, and generally in less than 5 minutes.

Attempts have been made to overcome these problems by positioning insulators about the edges of the cell stack elements, by providing gaps or spaces about the edges for accumulation of the alloy without bridging electrodes and by modifications to the electrochemical system to suppress formation of the alloy. These attempts may tend to decrease the efficiency of the electrochemical system or its capability to produce electricity, may only be partially successful in preventing this bridging, may produce reaction products which limit effective battery usage, or may substantially add to cost of manufacture. Typical batteries which include one or more of these modifications to minimize these shortcomings are described in U.S. Pat. No. 3,527,615 to R. P. Clark et al for "Thermal Battery Having Protectively Coated Calcium Anode to Prevent Alloy Shorting," issued Sept. 8, 1970, and in the copending U.S. Application Ser. No. 351,926 to A. R. Baldwin et al for "An Improved Thermal Battery," filed Apr. 17, 1973.

SUMMARY OF INVENTION

In view of the above, it is an object of this invention to provide a new and improved thermal battery which may minimize the formation of molten materials about the edges of the battery cells and which provides longer cell and battery operation.

It is a further object of this invention to provide such an improved thermal battery without substantial modification to existing thermal battery arrangements.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention may be made by those skilled in the art.

The invention comprises a thermal battery which utilizes a calcium anode with a DEB pellet and a heat generating disc as part of each cell and includes calcium hydroxide uniformly and homogeneously mixed with the electrolyte of the DEB pellet.

DESCRIPTION OF DRAWING

The invention is illustrated in the accompanying drawing wherein.

DETAILED DESCRIPTION

Figure 1:
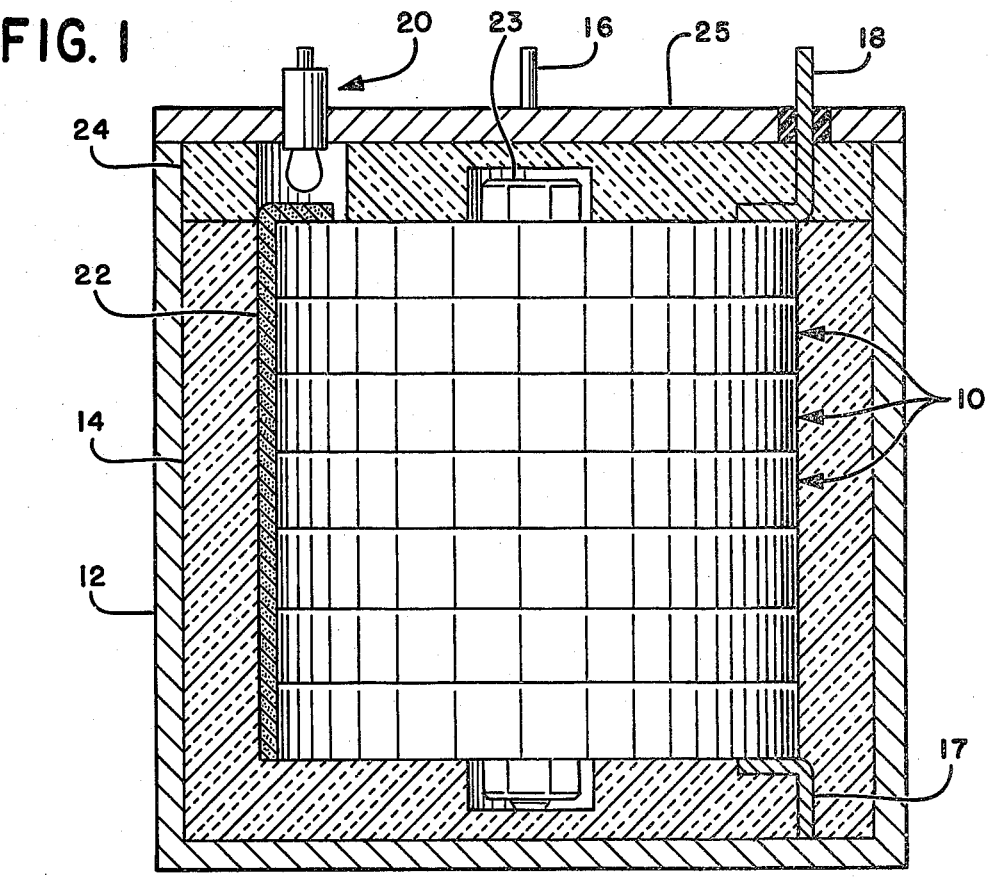
FIG. 1 is a partially cross sectioned view of a thermal battery in which this invention may be utilized.

The thermal battery may include a plurality of electrochemical cells 10 stacked one upon the other in electrical series within a suitable casing 12 and thermal insulating barrier 14. Electrical connections may be made in an appropriate manner by suitable electrical leads and terminals 16, 17 and 18 to the respective positive and negative terminals of the upper and lower battery cells in the stack. The heat or thermal generating elements for the battery, which are generally positioned as a part of each battery cell with or without additional heat generating elements at each end of the battery, may be ignited to activate the battery by a suitable electrical match or detonator 20 and heat powder or fuse 22 which is coupled between the match 20 and the heating generating elements in each cell. The battery is normally formed by first stacking the individual cell elements to form separate cells and then the cells stacked together in the form shown in FIG. 1 and emplaced within the casing 12 and insulator 14 under suitable pressure, such as by a compression force applied by a bolt 23 passing through the center of the cells, or other suitable mechanisms. The so stacked battery cells may then be covered with an end insulator 24 and a casing cover 25 in an appropriate manner. The battery is operated by initiating the electrical match 20 and in turn the heat powder 22 and the individual heat generating elements of the cell stack and the electrical current drawn off through leads 16, 17 and 18.

Figure 2:
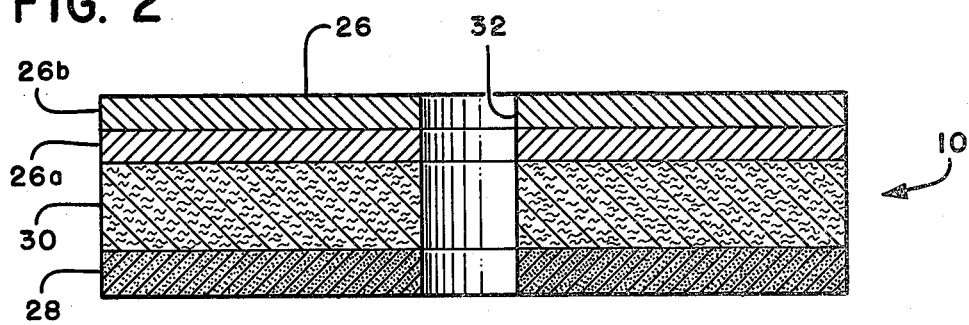
FIG. 2 is a cross-sectional view of a battery cell which may be utilized in the battery of FIG. 1 and which may incorporate features of this invention.

The individual cells, in accordance with this invention and as shown in FIG. 2, may include an anode electrode 26 and a heat generating disc 28 separated by a DEB pellet 30. Each of the discs or pellets is formed in a generally circular or annular shape of similar or the same diameters and may be provided with a central opening or bore 32 for receipt of the battery cell compression mechanism. The individual cell 10 elements are stacked in the manner shown to provide a sandwich of the anode electrode 26, DEB pellet 30 and heat generating disc 28. The anode 26 may be formed of calcium as a bimetal disc, such as a layer 26a on supporting conductive disc or plate 26b.

The DEB pellet 30 may be formed from a mixture of a depolarizer and binder with a normally solid fusible electrolyte which becomes conductive upon being heated to above its melting point. For example, the electrolyte may be a eutectic mixture of potassium chloride (KCl) and lithium chloride (LiCl). The depolarizer may be calcium chromate while the binder may be a finely divided silica having a surface area of about 390 square meters/gram. The DEB is normally mixed at a weight percent (w/o) ratio of 37/56/7 with the electrolyte of a eutectic mixture of about 45/55 w/o LiCl/KCl. The heat generating disc 28 may be formed from such as iron-potassium perchlorate or the like which, when ignited, is electrically conductive and produces a minimum of gas or other deleterious products. The heat pellet may be an 88/12 w/o mixture of iron and potassium perchlorate which may exhibit a calorific output of about 222 calories per gram.

Prior thermal batteries utilize a DEB pellet which comprised the above mixture of materials. It has been found, that the amount of calcium-lithium alloy formed on the edge of thermal battery cells may be reduced significantly, particularly at low current densities, without degrading cell life when the DEB composition of the cells is modified in accordance with this invention. The modified electrolytes were prepared with from about 2 to about 10 w/o calcium hydroxide ($Ca(OH)_2$) added to the electrolyte eutectic mixture. For example, the electrolyte portion of the DEB with 6 percent Ca-$(OH)_2$ may be at a w/o ratio of 41.36 LiCl/52.64 KCl/6 $Ca(OH)_2$.

Figure 3:
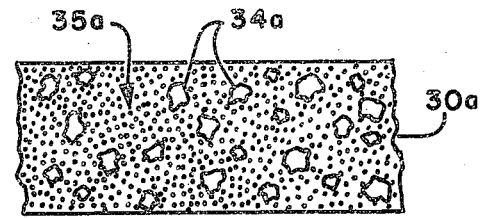
FIG. 3 is an expanded, diagrammatic representation of a portion of cell cross section illustrating the general appearance of a prior DEB pellet before operation of the cell.

FIG. 3 illustrates diagrammatically a cross section at about 32 magnification of a DEB pellet 30a without $Ca(OH)_2$ before use in a cell. In FIG. 3, the large chunks of material 34a (which are white in color) appear to be binder and electrolyte material. The overall appearance of the DEB pellet 30 is a rather coarse and somewhat inhomogeneous mixture of the material 34a and a yellowish, granular material 35a.

Figure 4:
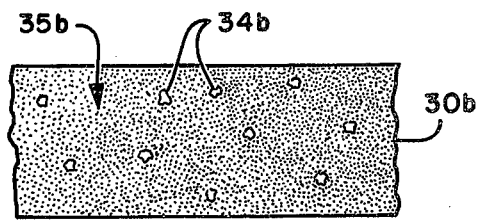
FIG. 4 is an expanded, diagrammatic representation of a DEB pellet which includes calcium hydroxide additive.

FIG. 4 shows a similar DEB pellet 30b, but with about 6 w/o $Ca(OH)_2$ added to the electrolyte of DEB pellet 30b. As can be seen from FIG. 4, the DEB pellet 30b is of much more uniform and homogeneous appearance with very little indication of the chunks or pieces 34b which appeared in the DEB pellet 30a without $Ca(OH)_2$ additive, even though the DEB pellet both with and without the $Ca(OH)_2$ additive are prepared in the same manner. DEB pellet 30b appears almost entirely as a uniform, yellow, granular-like material 35b.

A number of cells were made in which all the DEB pellets and other members were prepared in essentially the same manner. After the individual pellets are formed and stacked in the cell arrangement of FIG. 2 and placed under a compression of about 13K pascals (2 psi), the cells were activated at temperature of about 780K.

Typical performance data for such cells are indicated in the following table in which cells were discharged at about 65 and 16 milliamps/square centimeter ($ma/cm^2$).

| Current Density $ma/cm^2$ | $Ca(OH)_2$ in E(w/o) | Peak Voltage (volts) | Short/ Total | Discharge Time Above 2 Volts (sec) | Alloy (mg) |
|---|---|---|---|---|---|
| 65 | 0 | 2.57 | 3/3 | Sh | 36 |
| 65 | 2 | 2.56 | 0/3 | 991 | 1 |
| 65 | 4 | 2.55 | 0/3 | 1065 | 1 |
| 65 | 6 | 2.51 | 0/3 | 699 | Nil |
| 65 | 8 | 2.44 | 0/3 | 325 | Nil |
| 65 | 10 | 2.37 | 0/3 | 63 | Nil |
| 16 | 4 | 2.64 | 0/1 | 5384 | 21 |
| 16 | 6 | 2.66 | 0/1 | 6226 | 5 |
| 16 | 8 | 2.60 | 0/1 | 5618 | 4 |

It can be seen that improvements in cell operation are achieved with $Ca(OH)_2$ additives of from 2 to 10 w/o of the electrolyte and that the preferred range is from about 4 to 8 w/o. It has been found that the formation of calcium-lithium alloy shorts in cells and batteries occur more frequently when the cells and batteries are operated at lower circuit densities, but with $Ca(OH)_2$ additive, lifetimes of over 60 minutes have been obtained without shorting at current densities of about 15 $ma/cm^2$. At this current density, batteries without additives tend to short out in the first few minutes.

It has also been found that at higher discharge levels of about 65 $ma/cm^2$, some reduction in alloy production at cell edges may result by adding 10 u/o calcium chloride ($CaCl_2$) to the LiCl/KCl eutectic electrolyte instead of the $Ca(OH)_2$ additive. No reduction in cell lifetimes occurs as a result of the $CaCl_2$ electrolyte additives. Battery cells having a DEB pellet with additives such as potassium hyroxide and lithium hydroxide were tried in the electrolyte but even though there were some reductions in production of the calcium-lithium alloy about the pellet edges, overall performance was not as good as with $Ca(OH)_2$ additive.

What is claimed is:

1. A long-life thermal battery comprising a casing; a plurality of electrochemical cells in said casing, each cell including a calcium anode disc, an electrically conductive heat generating disc, and a normally solid fusible electrolyte disc sandwiched between said anode and heat generating discs, said electrolyte disc including a homogeneous mixture of a calcium chromate depolarizer, a silicon dioxide binder, and an electrolyte mixture of potassium chloride, lithium chloride, and calcium hydroxide; and means for igniting said heat generating discs.

2. The thermal battery of claim 1 wherein said electrolyte mixture includes a mixture of about 41 w/o lithium chloride, 53 w/o potassium chloride, and about 6 w/o calcium hydroxide.

* * * * *